April 1, 1952  R. K. LE BLOND ET AL  2,591,268
MILLING MACHINE TRANSMISSION CONTROL MECHANISM
Original Filed June 16, 1950  6 Sheets—Sheet 1

INVENTORS.
RICHARD K. LeBLOND
AND HARRY C. KEMPER
BY
ATTORNEY.

April 1, 1952     R. K. LE BLOND ET AL     2,591,268
MILLING MACHINE TRANSMISSION CONTROL MECHANISM
Original Filed June 16, 1950     6 Sheets-Sheet 2

INVENTORS.
RICHARD K. LeBLOND
AND HARRY C. KEMPER
BY Willard S. Groene
ATTORNEY.

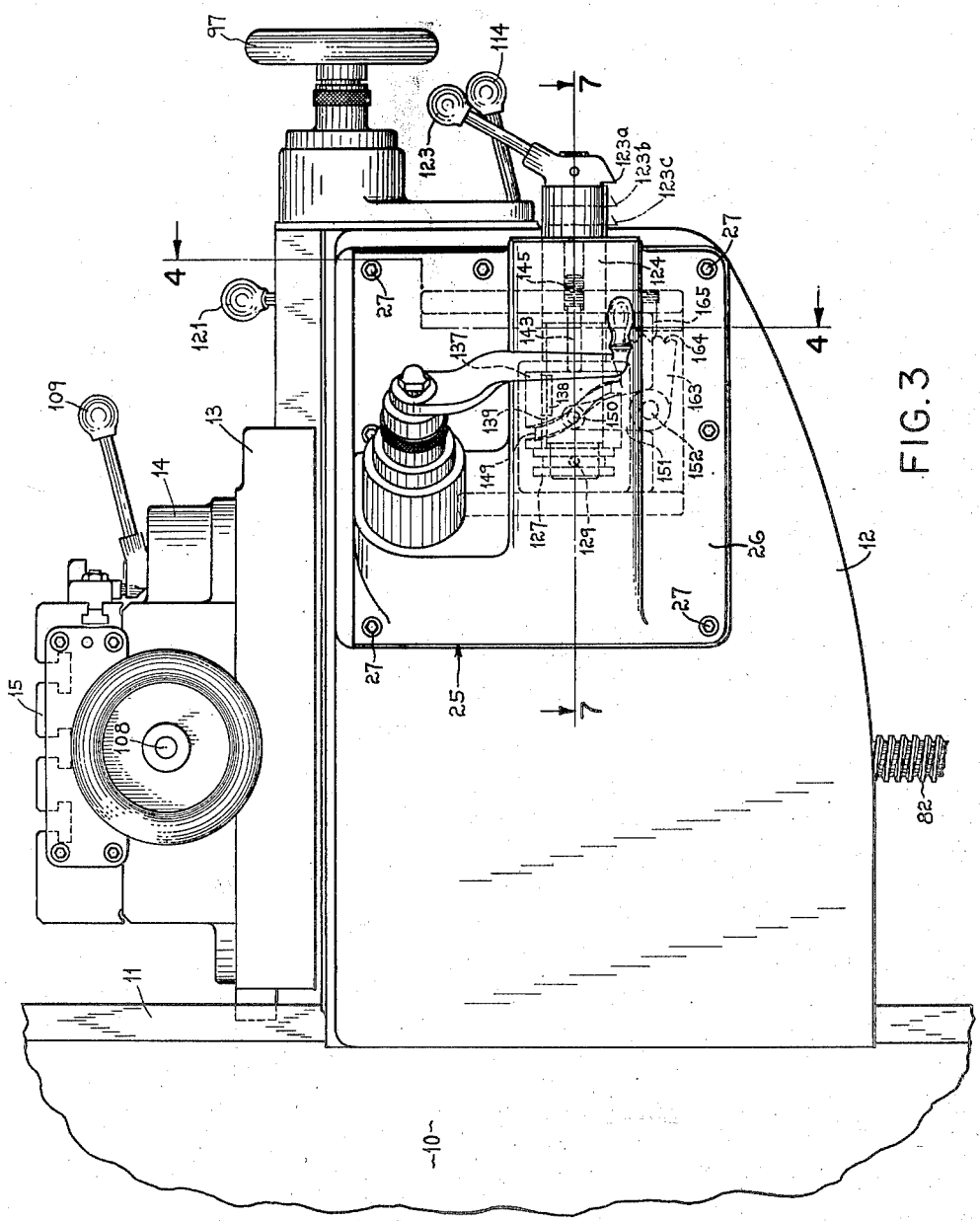

April 1, 1952     R. K. LE BLOND ET AL     2,591,268
MILLING MACHINE TRANSMISSION CONTROL MECHANISM
Original Filed June 16, 1950     6 Sheets—Sheet 4

INVENTORS.
RICHARD K. LeBLOND
AND HARRY C. KEMPER
BY
Willard L. Growne
ATTORNEY.

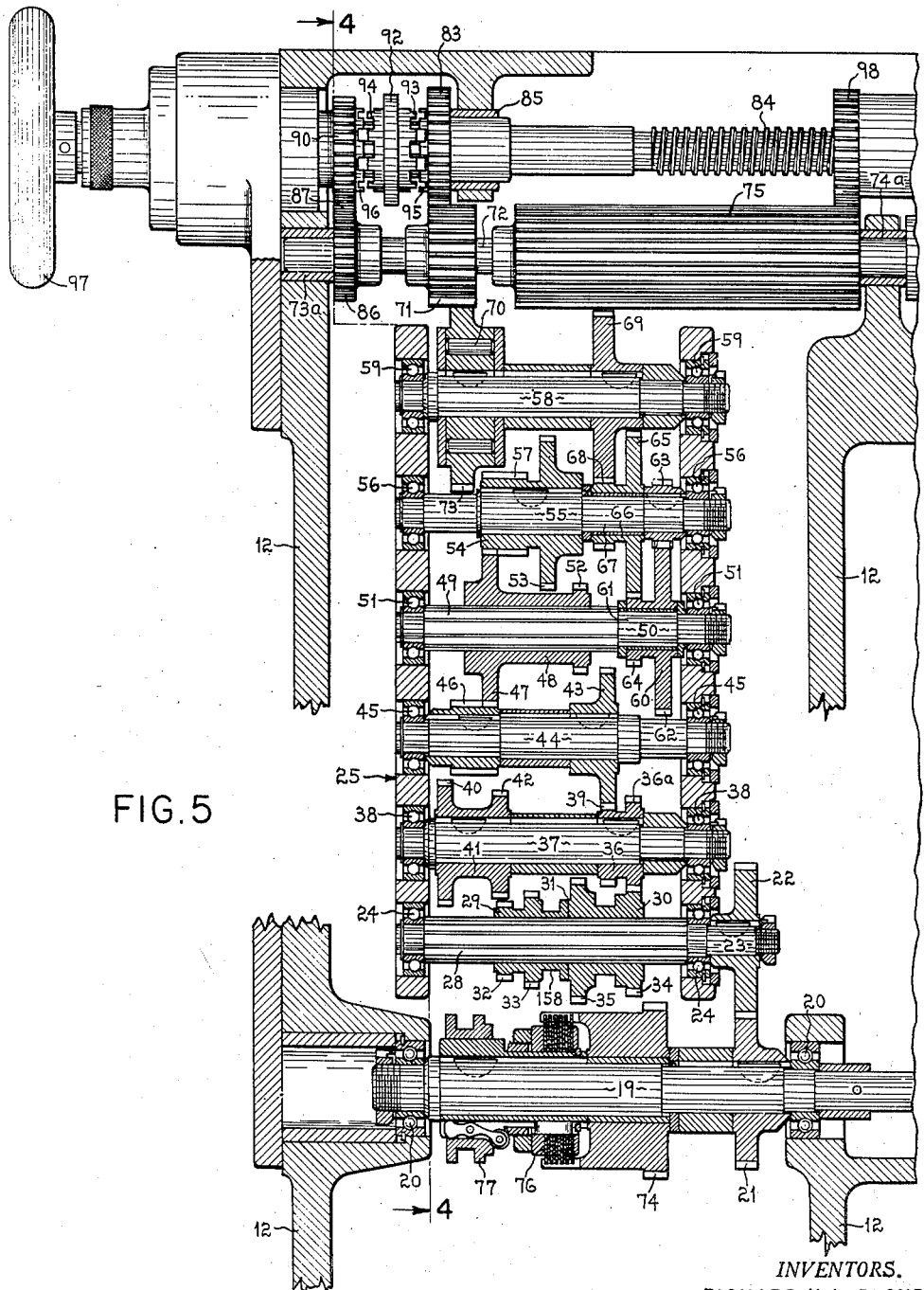

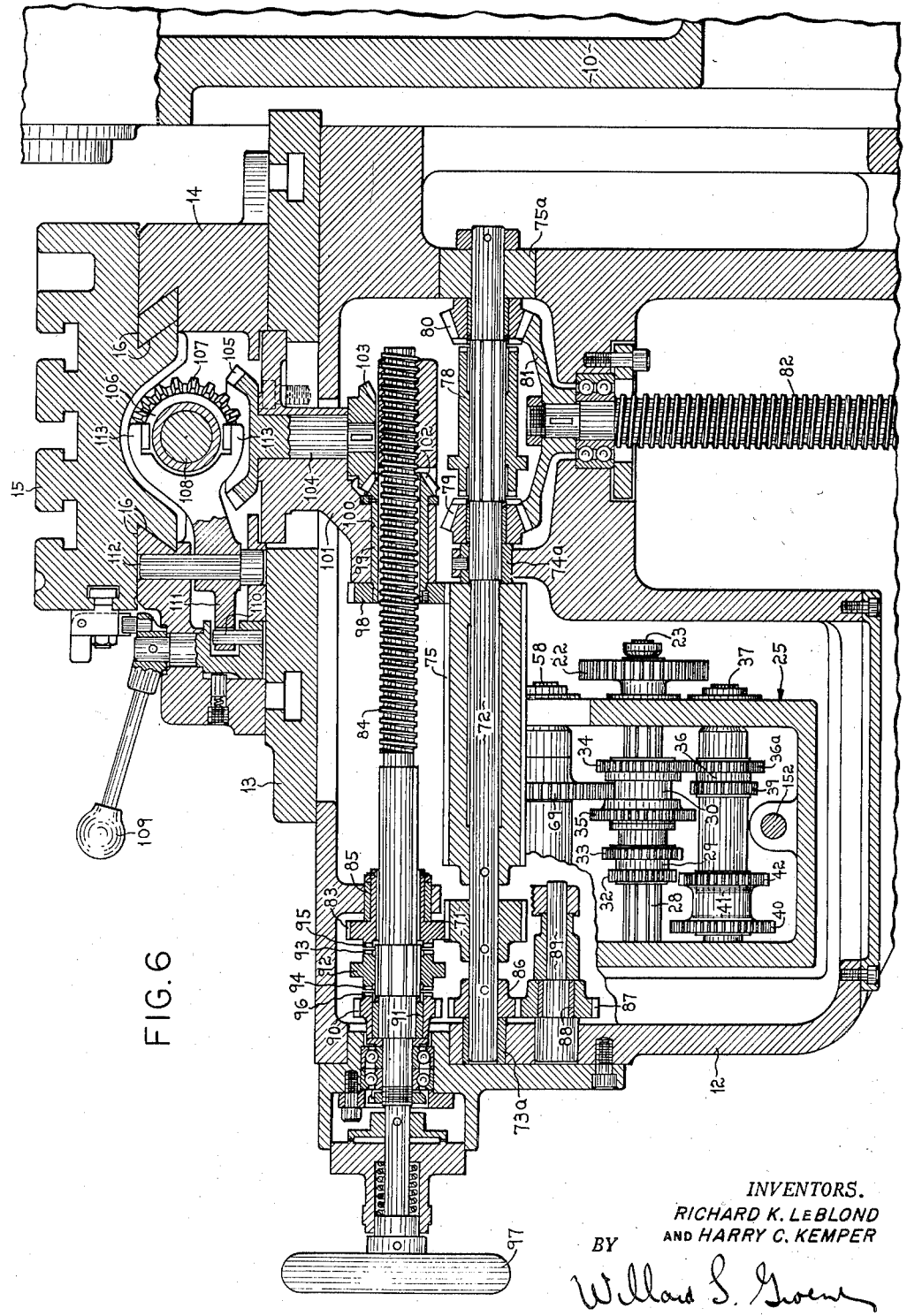

Patented Apr. 1, 1952

2,591,268

UNITED STATES PATENT OFFICE 2,591,268

MILLING MACHINE TRANSMISSION CONTROL MECHANISM

Richard Knight Le Blond, Cincinnati, and Harry C. Kemper, Goshen Township, Clermont County, Ohio, assignors to The R. K. Le Blond Machine Tool Company, Cincinnati, Ohio, a corporation of Delaware Original application June 16, 1950, Serial No. 168,462. Divided and this application April 24, 1951, Serial No. 222,696

4 Claims. (Cl. 74—337.5)

This invention pertains generally to transmission and control mechanism for milling machines, and is more particularly directed to such mechanism as utilized for actuating the knee, saddle and table movements of the milling machine.

This is a divisional application of original application, Serial No. 168,462, filed June 16, 1950, now Patent No. 2,580,307 issued December 25, 1951.

Another object of this invention is to provide an improved single handle control mechanism for selectively operating the feed drive transmission of a milling machine.

And still another object of this invention is to provide specific improvements in a change feed transmission and control for the feed drive of a milling machine knee, saddle and table which is economical to manufacture and highly accurate and quiet in operation while at the same time requiring a minimum of space.

It is also an object of this invention to provide certain improvements in the control mechanism for a sliding gear change feed transmission for a milling machine to improve the performance of the machine and reduce the cost and time required in its manufacture.

Further features and advantages of this invention will appear from a detailed description of the drawings in which:

Figure 3 is a left hand side elevational view of the knee shown in Figure 1.

Figure 5 is a diagramatic extended sectional view on the line 5—5 of Figure 4.

Figure 6 is a section on the line 6—6 of Figure 2.

Figure 1:
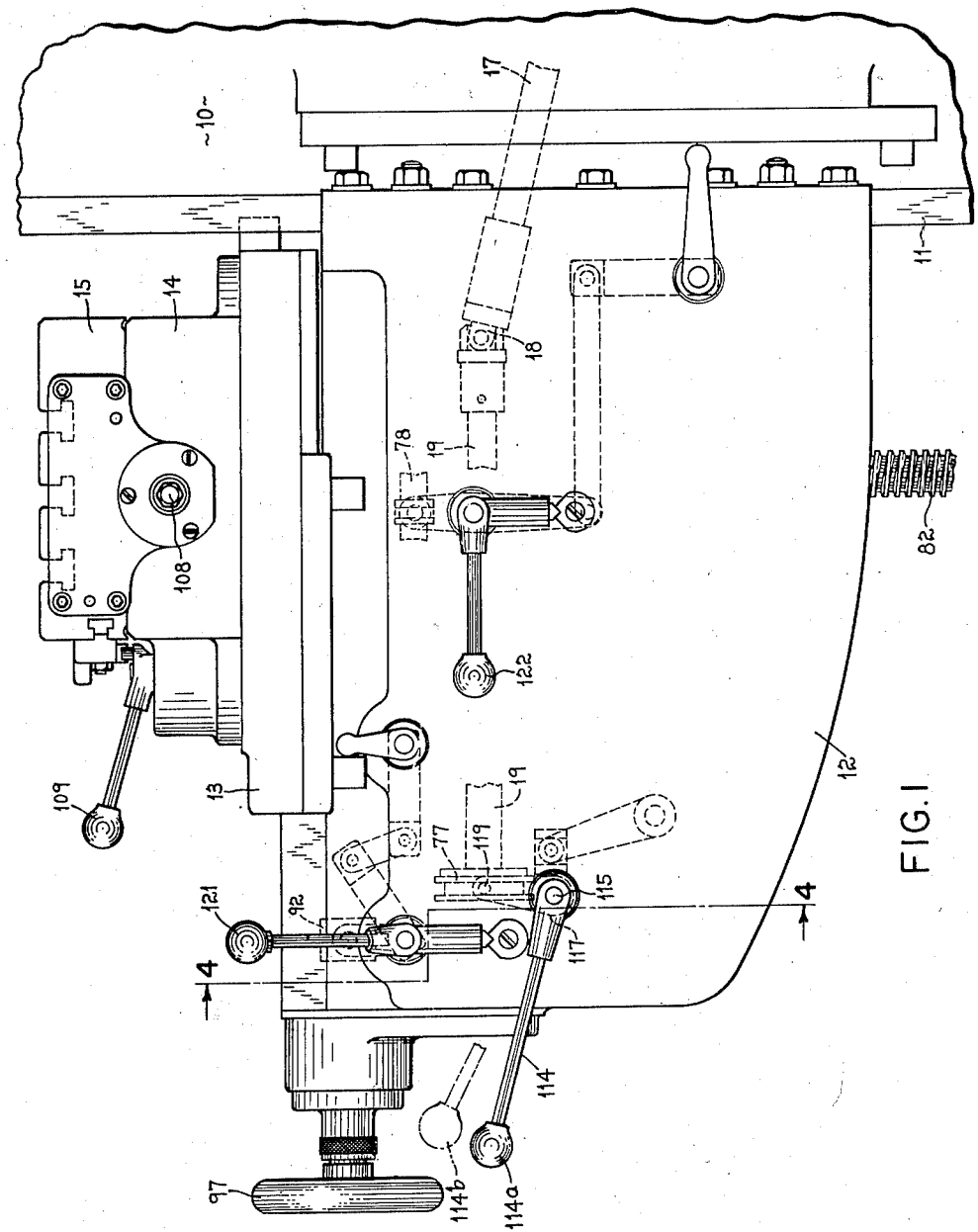
Figure 1 is a right hand side elevation of a milling machine knee incorporating the features of this invention.

For illustrative purposes this invention is shown applied to a typical universal milling machine having a column 10 having guide ways 11 upon which is slidably mounted the knee 12 for vertical reciprocation. On top of the knee is carried the saddle 13 on top of which is the usual swivel base 14 which carries the work table 15 on suitable guide ways 16. The knee, saddle and table are reciprocated in their respective movements from power derived from the tool spindle transmission not shown, which is connected in a well known manner to drive the feed input shaft 17, Figure 1, such for example as shown in Patent 2,338,121.

The shaft 17 is connected through a suitable universal joint 18 which in turn is connected to the input drive shaft 19 of the feed change transmission, the shaft 19 being journaled on suitable bearings 20 in the knee 12.

The feed drive power take off from the shaft 19 is transmitted from the gear 21 fixed to the shaft 19 to the gear 22 fixed on the shaft 23 journaled in suitable bearings 24 in the feed box housing 25, this housing being formed with a flanged outer portion 26 which is secured to the knee 12 by suitable bolts 27. Axially slidable on the spline portion 28 of the shaft 23 are two double gears 29 and 30 which are secured together by suitable means such as welding or the like at 31. The double gear 29 comprises the small gear 32 and the larger gear 33 while the double gear 30 comprises the smaller gear 34 and the larger gear 35. The assembly of gears just described are free to shift axially of the shaft 23 on the spline portion 28 thereof so that the gear 34 engages the gear 36a of the double gear 36 fixed to the shaft 37 journaled on suitable bearings 38 in the feed box housing 25. The gear 35 is adapted to slide into an engagement with the gear 39 of the double gear 36. Similarly, gear 32 is adapted to slide into driving engagement with the gear 40 of the double gear 41 fixed to the shaft 37 while the gear 33 is arranged to engage the gear 42 of the double gear 41. By this arrangement sliding the double gears 29—30 on the shaft 23 to four selected positions, four different speeds of rotation are provided for the shaft 37.

Power take off from the shaft 37 is derived from the gear 39 which constantly drives a gear 43 fixed to the shaft 44 journaled on suitable bearings 45 in the feed box housing 25. Also fixed on the shaft 44 is a wide face pinion 46 which is adapted to be slidingly engaged by the gear 47 of the double gear 48 slidably mounted on the spline portion 49 of a shaft 50 journaled in suitable bearings 51 in the feed box housing 25. The double gear 48 also has a gear 52 which may be slid into engagement with the gear 43 fixed to the shaft 44. The gear 52 may also engage a gear 53 formed on the double gear 54 which is fixed to the shaft 55 journaled in suitable bearings 56 in the feed box housing 25. Also formed on the double gear 54 is a wide faced gear 57 which meshes with the gear 47 of the double gear 48 on the shaft 50. Thus between the shafts 44—50—55 are 3 selectable gear ratios provided by sliding the double gear 48 on the shaft 50 as follows:

The drive from gears 46—47—57; the drive through gears 46—47 and 52—53; and the drive from gear 43—52 and gears 47—57. Thus 3 speed ratio changes are effected between the shafts 44 and 55.

Further feed reduction drive is obtained between the shaft 55 and the output shaft 58 journaled in suitable bearings 59 in the feed box housing 25. This comprises a double gear 60 journaled on the bearing portion 61 of the shaft 56, the double gear 60 comprising a large gear 62 which is driven from a pinion 63 fixed to the shaft 55. A smaller gear 64 of the double gear 60 drives the large gear 65 of the double gear 66 journaled on the bearing portion 67 of the shaft 55. The gear 68 formed on the double gear 66 drives a gear 69 fixed on the shaft 58 to thereby bring the final drive out from the feed box 25 to the shaft 58.

Power output from the shaft 58 of the feed box 25 is transmitted through an overrunning clutch 70 to the gear 71 which is fixed on a shaft 72 journaled in suitable bearings 73a, 74a, and 75a in the knee 12 of the milling machine, the gear 71 being driven by the outside gear 73 of the overrunning clutch 70.

Rapid traverse drive power to the shaft 72 is derived from a gear 74 journaled on the shaft 19 which is constantly in mesh with the elongated gear 75 suitably fixed to the shaft 72. The gear 74 may be connected to or released from driving relationship on the shaft 19 by means of a suitable multiple disk clutch 76 which is actuated by the usual shifter spool 77 in a well known manner. Thus whenever the clutch 76 is engaged direct rapid driving power from the shaft 19 is immediately transmitted to the elongated gear 75 on the shaft 72 to affect rapid rotation of the shaft 72 while at the same time the overrunning clutch allows the gear 73 to rotate more rapidly than the shaft 58 even though the feed drive is continuing at a much slower rate to the shaft 58 from the shaft 19. As soon as the multiple disk rapid traverse clutch 76 is disengaged the feed driving power as described immediately picks up through the overrunning clutch 70 to apply the feed drive to the shaft 72 through the gear 71 as described.

The knee 12 of the milling machine is reciprocated in vertical movement at feed and rapid traverse rates by shifting the reversing clutch member 78 to engage either one or the other of the bevel pinions 79 and 80 journaled on the shaft 72 as best seen in Figure 6. Each of the bevel pinions 79 and 80 are in constant engagement with the bevel gear 81 fixed to the elevating screw 82 to effect raising and lowering of the knee of the milling machine in the well known manner.

The saddle 13 is reciprocated in horizontal in and out movement by power from the shaft 72 which is connected through the gear 71 to a gear 83 journaled on the saddle cross feed screw 84 and held against axial movement in the bearing 85 carried in the knee 12. A reversing gear train comprising the gear 86 fixed on the shaft 72 drives an idler pinion 87 journaled on a suitable bearing 88 on the shaft 89 rigidly held in the knee 12. The idler 87 in turn drives the gear 90 journaled against axial movement on a suitable bearing 91 around the cross feed screw 84. A clutch spool 92 having clutch teeth 93 and 94 respectively engage the clutch teeth 95 and 96 of the gears 83 and 90 so as to affect a reversal drive of the screw 84 in one direction or the other or a neutral position of non-drive to the screw 84. The cross feed screw 84 is connected through suitable nut mechanism not shown to actuate the saddle in a well known manner. The cross feed screw may also be rotated manually by means of a suitable hand wheel 97 connected to the outer end of the shaft 84.

The drive for actuating the work table 15 is derived from the gear 75 which drives a gear 98 fixed on the bevel pinion sleeve 99 journaled in a suitable bearing 100 carried in the downwardly extending bracket 101 which in turn is supported on the swivel base 14 of the milling machine. The pinion sleeve 99 has a bevel pinion 102 formed thereon which in turn drives a bevel gear 103 fixed to the vertical shaft 104 which in turn has a bevel gear 105 in engagement with a pair of mating bevel gears similar to the gear 79 and 80 already discussed in connection with the knee elevating mechanism. A suitable clutch device indicated at 106 connects the bevel pinion 107 to apply the drive to the table feed screw 108 in a well known manner. A suitable trip and control lever 109 connected through suitable linkage mechanism at 110 through the lever 111 pivotally mounted on the pin 112 fixed to the swivel base 14 and having the forked ends 113 serve to control the trip clutch for the work table 15 in a conventional manner.

The control of the rapid traverse to the knee, saddle and table is affected by means of the control lever 114 mounted on a rock shaft 115 journaled in a suitable bearing 116 in the knee 12 of the milling machine. The inner end of the rock shaft 115 has fixed to it a shifter yoke 117 by means of the pin 118 and has end portions 119 which engage in the annular slot 120 of the clutch spool 77. Moving the control lever upwardly from position 114a to position 114b causes the clutch 76 to be engaged to apply the rapid traverse drive power as described. Release of the lever from the position 114b allows it to return to the position 114a to disconnect the rapid traverse driving power. The member to be actuated at rapid traverse or at feed is determined by the respective control levers, control lever 109 regulating the table movement, lever 121 controlling the cross feed or saddle movement and lever 122 controlling the vertical movements of the knee. Since the detail structure of these control levers form no part of this invention it is sufficient to state that the control lever 121 through suitable mechanism operates the clutch spool 92 described for connecting the drive power from the shaft 72 to the cross feed screw 84 in one direction or the other. Also the control lever 122 operates the clutch spool 78 for engaging either the bevel pinion 79 and 80 as described to affect the stoppage of one direction or the other drive to the elevating screw 82 for the knee.

Figure 7:
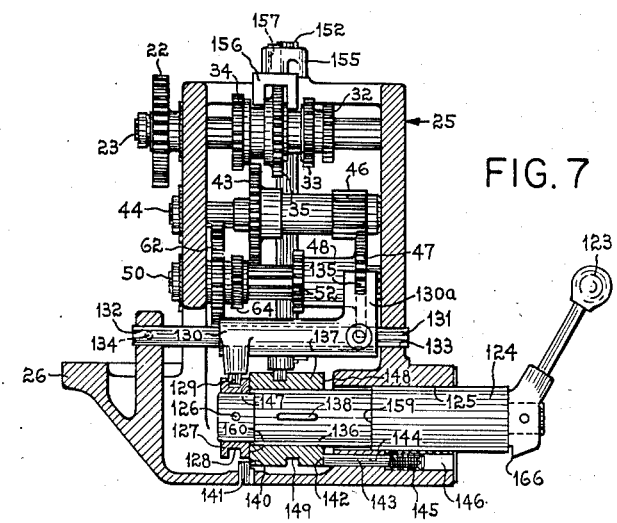
Figure 7 is a sectional view on the line 7—7 in Figures 2, 3, and 4.
Figure 4:
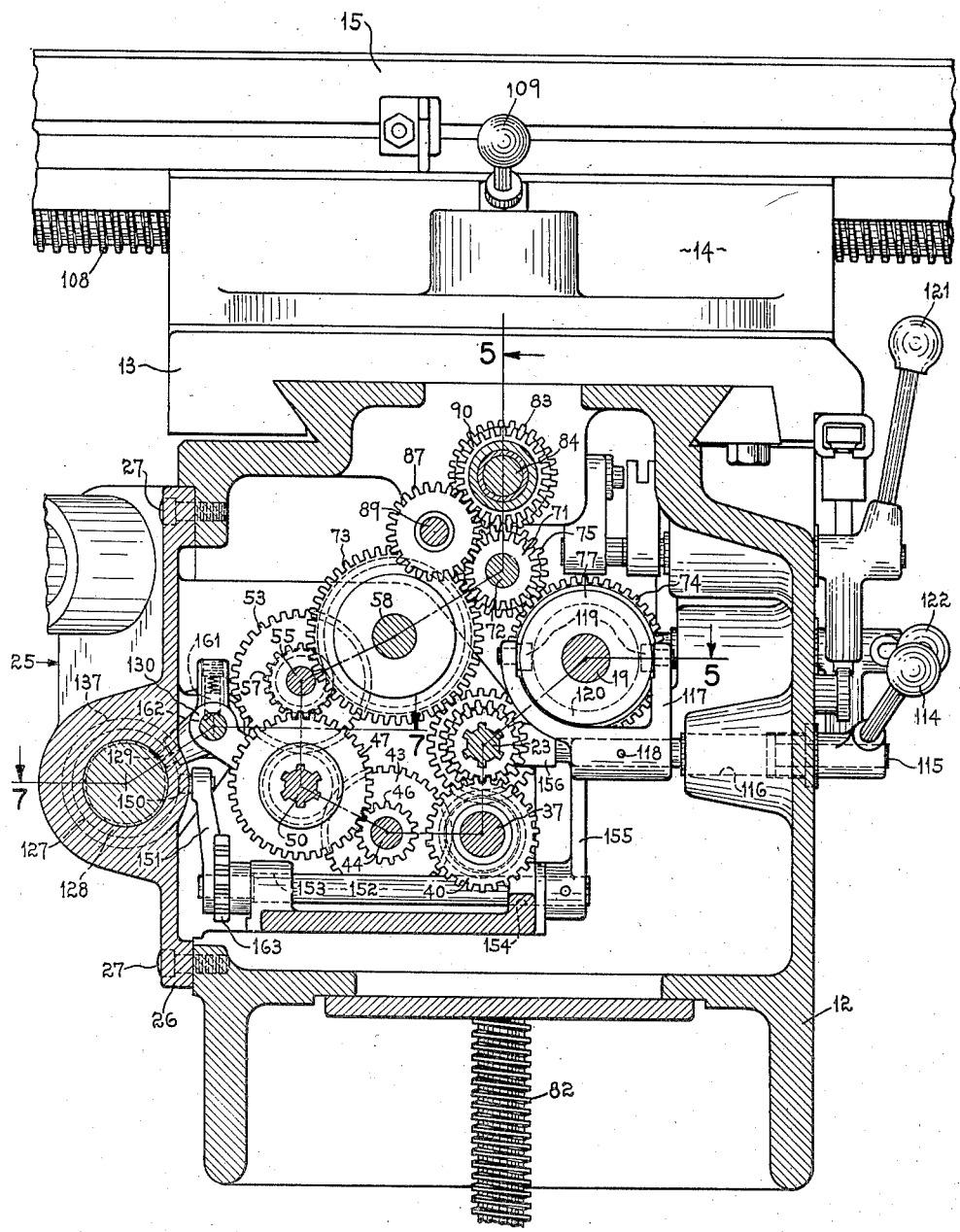
Figure 4 is a sectional view through the knee of the line 4—4 of Figures 1, 3, and 5.

Referring more particularly to Figs. 4, 5, and 7, the feed change gear box 25 has a single lever control device comprising the lever or handle 123 which is carried on an axially slidable and rockable shaft 124 for simultaneously controlling the shiftable gears 29—30 and 48 of the feed box for any desired selection of feed rate. The axially slidable and rockable shaft 124 is supported in a suitable bearing 125 in the feed box 25 and has fixed on its inner end by a pin 126 the shifter spool 127 having an annular slot 128 which is engaged by a pin 129 carried in the shifter yoke 130 which is axially slidable on the rod 131 rigidly supported in the feed box 25 on suitable bearings 132 and 133 and held in place therein by means of the set screw 134. The shifter yoke 130 has a projecting arm 130a having a forked end to form a slot 135 which engages each of the side faces of the gear 47 of the double gear 48 so that axial movements of the handle 123 and shaft 124 to the positions 123a, 123b, and 123c, shifts the gear 48 to its 3 selectable positions.

Rocking motion of the control lever 123 and shaft 124 causes shifting of the gear 29—30. Slidably mounted on the bearing surface 136 of the shaft 124 is the cam drum 137 which is connected to be rotated by rocking of the shaft 124 through a suitable key 138 fixed to the shaft 124 but slidable in the key way 139 of the cam drum 137. The cam drum 137 is restricted against axial movement but allowed freedom of rotary movement by confinement between the abutment face 140 of the abutment pin 141 fixed in the feed box housing 25 and the end 142 of the abutment pin 143 slidably mounted in a suitable bore 144 in the feed box housing 25. A suitable adjustable set screw 145 carried in the threaded bore 146 of the feed box housing 25 serves to relatively position the surface 142 of the pin 143 relative to the abutment surface 140 of the abutment pin 141 so as to provide a proper running fit of the sides 147 and 148 of the cam drum 137. Thus rocking motion of the control lever 123 affects rotation of the cam drum 137 while at the same time enabling the lever 123 to be moved in an out to shift the gear 48 as described.

Around the periphery of the cam drum 137 is formed a helical cam slot 149 in which operates the pin 150 fixed in the outer end of the lever arm 151 which is secured to the rock shaft 152 supported in suitable bearings 153 and 154 in the feed box housing 25. The outer rearward end of the rock shaft 152 has a lever arm 155 secured thereto and extending upwardly and terminating in a boss carrying a shifter piece 156 supported in a suitable journal bearing 157, the member 156 engaging in the annular groove 158 of the shiftable gear 29—30. Thus, when rocking motion is imparted to the shaft 124 by twisting the control handle 123 the helical cam slot 149 causes the lever 151 and the lever 155 to shift the gear 29—30 to its respective four operative positions.

The in and out sliding movement of the shaft 124 is limited by engagement of the face 159 with the face 148 of the cam drum 137 and by the face 160 of the spool 127 engaging the face 147 of the cam drum 137. A suitable detent comprising a spring pressed plunger 161 operating in detent notches 162 formed in the shaft 131 provides means for readily positioning the shaft 124 in its three shiftable positions. The positioning of the control lever in rotary positions is accomplished by means of the segmental detent portion 163 formed integral with the lever 151 and having a series of four detent notches 164 which are engaged by the spring urged detent 165 carried in the feed box housing 25.

Figure 2:
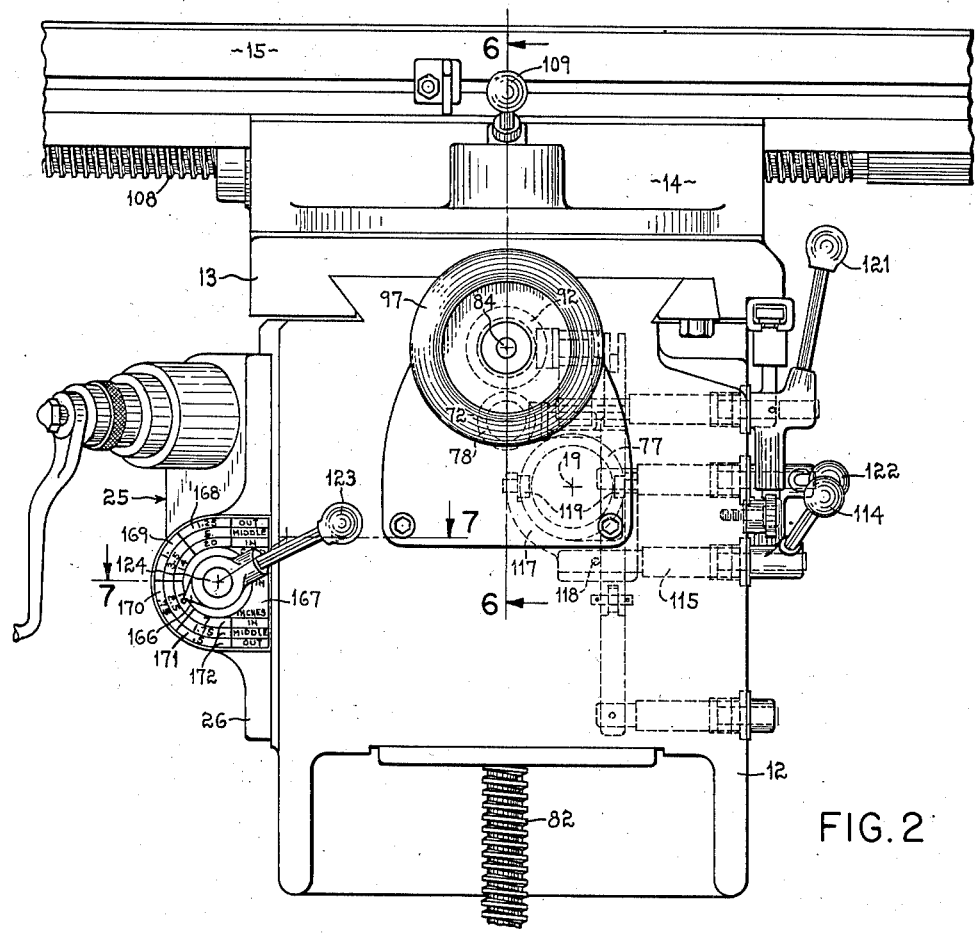
Figure 2 is a front elevation of the milling machine knee shown in Fig. 1.

Formed on the control handle 123 is an indicating pointer 166 which cooperates with the U-shaped index plate 167 which has a series of four groups of three numbers indicated at 168, 169, 170, and 171, as best shown in Figure 2. These four positions represent the four shiftable movements for the gear 29—30. The three concentric groupings of figures 172 represent the three in and out positions for the handle 123 and the gear 48.

Referring particularly to Figure 5 it is to be noted that in the arrangement of the feed box gear train that there are never more than two gears combined in a double gear assembly. The advantage of keeping the gear construction limited to groups of two gears in a double gear greatly facilitates the accuracy of the heat treating operations and subsequent gear finishing work. It is also to be noted that the gears that are combined in the double gear set-ups are maintained in more nearly the same diameter and in no case is the very large gear combined closely with the very small gear in a double gear assembly. This further facilitates the manufacture and heat treating of the gears and provides a more effective and rigid transmission.

It is to be further noted that in the gear arrangement shown for the combined double gears 29—30 on the shaft 23 that the largest gear 35 is located one position from the end of the four gear assembly so as to give an absolute minimum of space required for a progressive gear shift to four positions for the gear 29—30 and thereby reduce the overall length of the shafts in the feed box transmission 25 effecting greater rigidity and accuracy of performance of the gear transmission.

It is to be further noted in connection with the three position shifting gear 48 on the shaft 50 that there is obtained the action of a double back gear drive through the gear shift position 46—47 and 52—53 in one extreme position and a double speed up in the other position effected through the gearing 43—52 and 47—51 so as to afford a very large ratio of speed change between the shafts 44 and 55. It is also to be noted in connection with the gear 48 that in making any of the three changes that only one gear engagement is required, this being due to the wide faced gears 46 and 57 which always maintain at least one gear engagement while the other gear changes are being undertaken. This makes for greater ease in shifting of the feed box transmission and a more rapid and easy selection of the desired feed rate by the operator.

Still another feature of the construction of the feed box transmission is that all of the various bearings 24, 38, 45, 51, 56 and 59 are identical and the respective supporting bores in the feed box housing 25 are also identical so as to facilitate the rapid and economical machining of all the bored holes in the housing 25 with the same set of boring tools. This makes for greater accuracy of the center distances between the various shafts and an improvement in the quietness and efficiency of operation of the various geared trains.

It is to be further noted that a maximum ratio is provided through the feed change gear box 25 (in this exemplary disclosure 40 to 1) while at the same time the difference in ratio between any two gears is small in no case more than 2½ to 1, so as to maintain a good involute tooth action between each and every gear in the feed box transmission, thus providing a smooth, quiet and steady flow of power to the machine tool.

It is to be further noted that the entire feed ranges are effected by moving only two sliding gears, namely the gears 29—30 and the gear 48 from a common single lever control 123 which may readily move the gears in proper sequential order to any desired feed rate as indicated on the index dial 167.

It is also to be noted that the feed or speed increase for the transmission is effected by means of the control handle 123 which is pushed in and rotated to the right and in normal manner for effecting increases, and which is pulled out and rotated toward the left as seen in Figures 2 and 7 to decrease the feed or speed from the transmission. This greatly facilitates the quick and easy selection of change in feed and speed even without reference to specific values on the feed or speed change indicating dial 167.

It should also be noted in view of the above description that in shifting the two gears 29—30 and 48 that feed and speed changes are obtained without shifting through a fast gear to get down to a slow rotating gear and vice versa. This makes for easy shifting and elimination of substantially all clash in making the various rate changes desired.

There has thus been provided an improved feed or speed change transmission mechanism for a milling machine or other machine tools having certain specific structural improvements over all former devices so as to provide a most efficient transmission mechanism both from the operative and manufacturing standpoints.

Having thus fully described this invention and its numerous attendant advantages, it is obvious that many changes may be made in the form, construction and arrangement of the parts without departing from the spirit or scope of the invention or sacrifice its attendant advantages, the form herein described being a preferred embodiment for purposes of exemplifying this invention.

The invention is claimed as follows:

1. In a change speed transmission having, a transmission housing, a gear set, a pair of shiftable members in said gear set, a single lever control mechanism for shifting said members comprising, an axially slidable and rockable shaft carried in the change speed transmission housing, a handle rigidly fixed on the outer end of said shaft, a shifter spool fixed on the inner end of said shaft engaging a shifter yoke movably mounted in said housing, means for connecting said yoke to a shiftable member in said transmission, a shifter cam drum located between said lever and said spool relatively axially slidable on and supported by said slidable and rockable shaft, means carried by said housing for restricting axial movement of said cam drum relative to said housing while allowing rotary movement thereof by the rocking motion of said shiftable and rockable shaft, a cam track in said cam drum, shifting lever mechanism actuated from said cam track upon rocking rotation of said handle, and means for connecting said shifter lever mechanism to shifting members in said change speed transmission.

2. In a change speed transmission having, a transmission housing, a gear set, a pair of shiftable members in said gear set, a single lever control mechanism for shifting said members comprising, an axially slidable and rockable shaft carried in the change speed transmission housing, a handle rigidly fixed on the outer end of said shaft, a shifter spool fixed on the inner end of said shaft engaging a shifter yoke movably mounted in said housing, means for connecting said yoke to a shiftable member in said transmission, a shifter cam drum located between said lever and said spool relatively axially slidable on and supported by said slidable and rockable shaft, means carried by said housing for restricting axial movement of said cam drum relative to said housing while allowing rotary movement thereof by the rocking motion of said shiftable and rockable shaft, a cam track in said cam drum, shifting lever mechanism actuated from said cam track upon rocking rotation of said handle, means for connecting said shifter lever mechanism to shifting members in said change speed transmission, an index pointer fixed on said handle, and a U-shaped index dial fixed on said housing indicatively related to said index pointer on said handle.

3. In a change speed transmission having, a transmission housing, a gear set, a pair of shiftable members in said gear set, a single lever control mechanism for shifting said members comprising, an axially slidable and rockable shaft carried in the change speed transmission housing, a handle rigidly fixed on the outer end of said shaft, a shifter spool fixed on the inner end of said shaft engaging a shifter yoke movably mounted in said housing, means for connecting said yoke to a shiftable member in said transmission, a shifter cam drum located between said lever and said spool relatively axially slidable on and supported by said slidable and rockable shaft, means carried by said housing for restricting axial movement of said cam drum relative to said housing while allowing rotary movement thereof by the rocking motion of said shiftable and rockable shaft, a cam track in said cam drum, shifting lever mechanism actuated from said cam track upon rocking rotation of said handle, and means for connecting said shifter lever mechanism to shifting members in said change speed transmission, and means for limiting the outward axial movement of said lever by axial engagement of the spool with said cam drum.

4. In a change speed transmission having, a transmission housing, a gear set, a pair of shiftable members in said gear set, a single lever control mechanism for shifting said members comprising, an axially slidable and rockable shaft carried in the change speed transmission housing, a handle rigidly fixed on the outer end of said shaft, a shifter spool fixed on the inner end of said shaft engaging a shifter yoke movably mounted in said housing, means for connecting said yoke to a shiftable member in said transmission, a shifter cam drum located between said lever and said spool relatively axially slidable on and supported by said slidable and rockable shaft, means carried by said housing for restricting axial movement of said cam drum relative to said housing while allowing rotary movement thereof by the rocking motion of said shiftable and rockable shaft, a cam track in said cam drum, shifting lever mechanism actuated from said cam track upon rocking rotation of said handle, means for connecting said shifter lever mechanism to shifting members in said change speed transmission, an index pointer fixed on said handle, and a U-shaped index dial fixed on said housing indicatively related to said index pointer on said handle, and means for limiting the outward axial movement of said lever by axial engagement of the spool with said cam drum.

RICHARD KNIGHT LE BLOND.
HARRY C. KEMPER.

REFERENCES CITED

The following references are of record in the file of this patent:

UNITED STATES PATENTS

| Number | Name | Date |
| --- | --- | --- |
| 1,817,727 | Hammersveld | Aug. 4, 1931 |

FOREIGN PATENTS

| Number | Country | Date |
| --- | --- | --- |
| 268,456 | Great Britain | Oct. 4, 1926 |